United States Patent [19]

Ohta et al.

[11] Patent Number: 4,755,812
[45] Date of Patent: Jul. 5, 1988

[54] METHOD OF DRIVING A RECORDING APPARATUS

[75] Inventors: Morio Ohta; Shizuo Tsuchiya; Hideaki Inoue, all of Higashiyamatoshi, Japan

[73] Assignees: Casio Computer Co., Ltd.; Casio Electronics Manufacturing Co., Ltd., both of Tokyo, Japan

[21] Appl. No.: 769,732

[22] Filed: Aug. 27, 1985

[30] Foreign Application Priority Data

Aug. 31, 1984 [JP] Japan .................................. 59-180488
Dec. 29, 1984 [JP] Japan .................................. 59-278388

[51] Int. Cl.$^4$ .............................................. G09G 3/36
[52] U.S. Cl. .................................... 340/784; 340/805; 350/331 T
[58] Field of Search ............... 340/713, 765, 784, 805; 350/331 R, 331 T, 346

[56] References Cited

U.S. PATENT DOCUMENTS

| 4,236,150 | 11/1980 | Chern | 340/765 |
| 4,386,836 | 6/1983 | Aoki et al. | |
| 4,417,785 | 11/1983 | Nakamura | 350/331 T |
| 4,462,027 | 7/1984 | Lloyd | 340/805 |
| 4,641,156 | 2/1987 | Ohta et al. | 350/331 T |

FOREIGN PATENT DOCUMENTS 57-171378 10/1982 Japan .

Primary Examiner—Gerald L. Brigance
Assistant Examiner—Jeffery A. Brier
Attorney, Agent, or Firm—Sandler & Greenblum

[57] ABSTRACT

A method of driving a liquid crystal recording device comprises applying a drive signal to liquid crystal micro shutters defined at the intersection of common electrodes that are normal to signal electrodes. The drive signal is a signal experienced by a microshutter as a result of the application of a selected signal to the common electrode and the application of a recording signal to the signal electrode. Both the selected and recording signals contain components of frequencies grater and less than a specified frequency which causes the dielectric anistotropy of the liquid crystal to disappear. A drive signal which opens or closes microshutters for a selected period of time includes a signal whose frequency is lower than said specified frequency, and superposed waveform obtained when the signal whose frequency is loser than the specified frequency is superposed upon a signal whose frequency is higher than the specified frequency. A driving waveform which reversely sets the microshutters open or closed for the selected period of time is formed of a signal including a frequency higher than the specified frequency and a zero frequency signal. As a consequence of the application of signals of this nature to the microshutters, the temperature characteristics of the liquid crystal microshutters are improved.

6 Claims, 16 Drawing Sheets

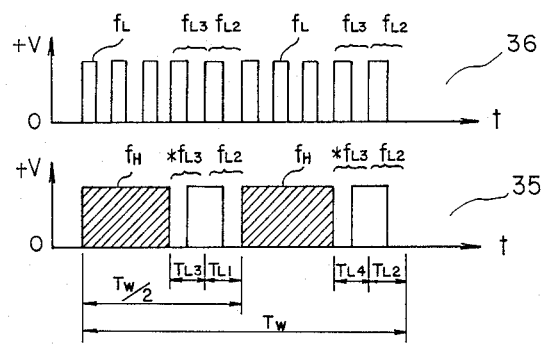
Fig. 5B
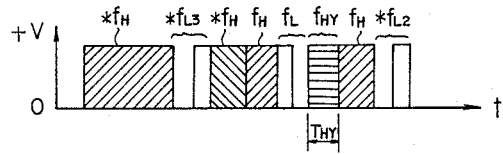
Fig. 5C
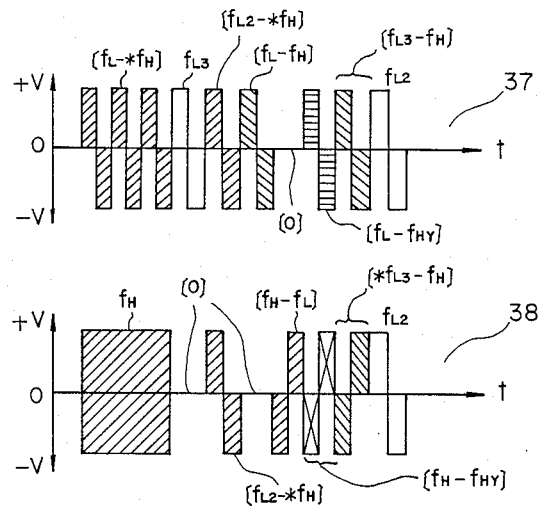

METHOD OF DRIVING A RECORDING APPARATUS

BACKGROUND OF THE INVENTION

The present invention relates to a method of driving a recording apparatus and, more particularly, it relates to a driving method at the time of driving a liquid crystal in a time division manner.

The recording apparatus in which a liquid crystal light shutter is employed is intended to carry out light writing on a photosensitive body by driving opened or closed a plurality of micro shutters in the liquid crystal light shutter by means of the control circuit, to shield or transmit the light of a light source arranged adjacent to the liquid crystal light shutter. In the case of this type of recording apparatus, the liquid crystal is required to have high speed response. Therefore, a liquid crystal whose dielectric anisotropy is inverted by the frequency of a signal applied to the micro shutters is employed and driven by two frequencies, one ($f_H$) of which is higher than a frequency ($f_C$) which makes the dielectric anisotropy of the liquid crystal zero, and the other ($f_L$) of which is lower than the frequency ($f_C$). In the case of such liquid crystal light shutter, recording is attained at a density of about 10 dots per 1 mm and in the case of size A4, for example, the micro shutters of about 3,000 units are needed per one line. For the purpose of preventing the number of wires and mounting area from being increased, therefore, the liquid crystal light shutter is usually driven in a time division manner. This time division drive is of such type that common and signal electrodes are crossed perpendicular to one another in the liquid crystal light shutter to form micro shutters at the crossed portions of both electrodes and recording signals are inputted to the signal electrodes while time-divided selection signals are inputted to the common electrodes.

According to this time division drive or 2-time division drive, for example, the light can be transmitted only for half the writing period $T_W$, and the time period during which the light can be transmitted becomes shorter in the case of n-time division drive, so that the photosensitive body can be short of the amount of exposure light. Therefore, the drive is performed in such a way that the selection signals are used to open or close the micro shutters for a selected time period $T_W/n$ of the one writing period $T_W$ and keep them set for the remaining time period $(1-1/n)T_W$ (which will be hereinafter referred to as non-selected time period) of the one writing period $T_W$. In the case of 2-time division drive, for example, selected signal in which signals of $f_H$, $f_L$, *$f_H$ and *$f_L$ shown in FIG. 1 A , said signals of *$f_H$ and *$f_L$ being shifted by 180° in phase from said signals of $f_H$ and $f_L$, mixed in one writing cycle is formed and applied to the common electrode. Further, one of four recording signals 1–4 shown in FIG. 1 B is selected and applied to the signal electrodes. Four kinds of drive signals 5–8 shown in FIG. 1 C are thus formed and one of these drive signals is applied to the micro shutters to thereby drive them opened or closed. Since a signal which is shifted by $T_W/2$ in phase from the signal which has been applied to the above-mentioned common electrode is applied to the other common electrode, a drive signal corresponding to the one shown in FIG. 1 C but shifted by $T_W/2$ in phase is applied to the micro shutters to drive them opened or closed.

Although the liquid crystal light shutter which is used to explain the present invention have been formed by a liquid crystal of the GH type, for example, which allows light to be transmitted through it upon its on-operation, a liquid crystal of the TN type which is provided between polarizing plates positioned at an orthogonal Nicol prism and which shields light upon its on-operation may be employed but it should be understood that the liquid crystal light shutter in this case is opened or closed reversely to those of the GH type liquid crystal.

Light transmission characteristics of the micro shutters obtained when the drive signals 5–8 are applied to the micro shutters are shown in FIG. 1D. A light transmission characteristic 9 is due to the drive signal 5 which is obtained when the pattern signal 1 is applied to the signal electrodes while the selected signal shown in FIG. 1 A is applied to the common electrodes, with the result that the paired micro shutters are opened. A light transmission characteristic 10 is due to the drive signal 6 which is obtained when the pattern signal 2 is applied to the signal electrodes while the selected signal shown in FIG. 1 A is applied to the common electrodes, with the result that ones of the paired micro shutters are open and the others are closed. Similarly, light transmission characteristics 11 and 12 are due to the drive signals 7 and 8 which are obtained when the pattern signals 3 and 4 are applied to close ones of the micro shutters and open the others in such a manner as to be reverse to the above-mentioned case, or close both of these micro shutters. ($f_L$- $f_H$) shown in FIG. 1 C represents a drive signal formed by the signals of $f_L$ and $f_H$, ($f_H$- *$f_H$), a drive signal formed by the signals of $f_L$ and *$f_H$ and (0) a silent signal.

When the liquid crystal light shutter are driven like this, selected micro shutters can be kept open even for the non-selected time period $(1-1/n)T_W$ in the case of n-time division drive and the signal $f_L$ is applied to the micro shutters for the last time period of one writing cycle $T_W$ to open them and eliminate the hysteresis effect peculiar to the liquid crystal, thereby enabling the liquid crystal light shutters to be opened or closed as if they were driven according to the static drive.

In the case of the above-described time division drive for the liquid crystal light shutter, however, the liquid crystal light shutters can be kept under their previously-set state for a non-selected time period, using the hysteresis effect of the liquid crystal, but their optimum temperature ranges only from 2 to 3 degrees. In addition, their optimum temperature changes, depending upon the quality of liquid crystal used, and it was therefore necessary to set a different temperature range in every recording apparatus. Further, the amount of light transmitted at the time of shutter opening is less sufficient compared to the case where the shutters are opened according to the static drive.

As apparent from the level difference between the light transmission characteristics 11 and 12, the amount of light transmitted when the micro shutters are closed becomes different, depending upon whether ones of the paired micro shutters are kept opened or closed at the time when the others are closed, thereby making the density of a recorded image different. This difference in the amount of light transmitted is caused more or less within the above-mentioned optimum temperature range and it becomes larger outside the optimum temperature range. In order to reduce the difference in the amount of light transmission, it is proposed that the voltage value of a frequency signal which serves to drive the liquid crystal employed by the recording apparatus is changed, but a more complicated circuit for obtaining multiple voltage values of this signal is needed.

SUMMARY OF THE INVENTION

The present invention is therefore intended to eliminate the above-mentioned drawbacks and the object of the present invention is to provide a method of driving a recording apparatus, by which the temperature range within which the liquid crystal light shutter is operated with reliability is enlarged, the amount of light transmitted is increased, and recorded images are enhanced in their contrast, in the case where the liquid crystal light shutters are driven according to the time division drive.

DETAILED DESCRIPTION OF THE PREFERRED EMBODIMENT

A first embodiment of the present invention will be described with reference to the accompanying drawings.

Figure 2:
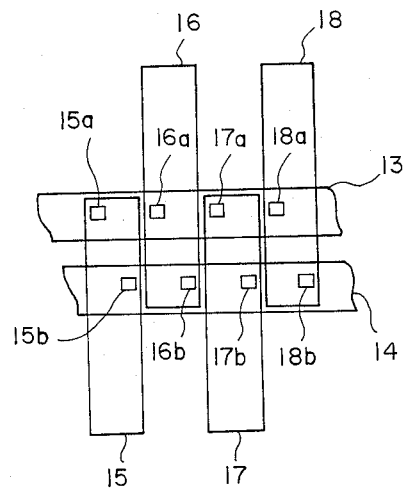
FIG. 2 shows a plan view of part of the liquid crystal light shutter.

The embodiment uses 2-time division drive and FIG. 2 shows part of the liquid crystal light shutter. In FIG. 2, common electrodes 13, 14 and signal electrodes 15-18 are crossed perpendicular to one another, and micro shutters 15a-18a and 15b-18b are formed by transparent electrodes each occupying a part of each of the crossed portions of the common and signal electrodes. Recording signals are applied to the signal electrodes 15-18 while selected signals are applied to the common electrodes 13, 14.

Figure 3A:
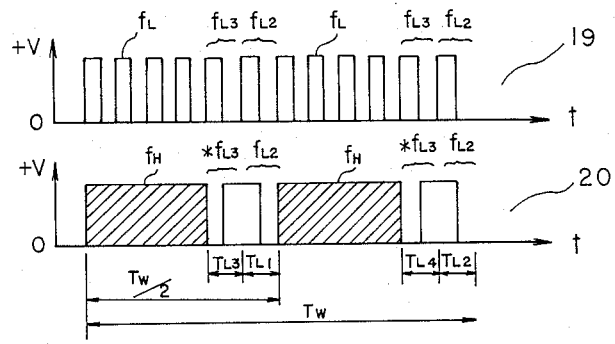
FIGS. 3A through 3C are waveform diagrams showing signals employed by a driving method of an embodiment of the present invention, and FIG. 3D a view showing light transmission characteristics obtained according to the driving method of the present invention.
Figure 3B:
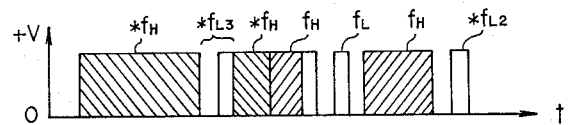
Figure 3C:
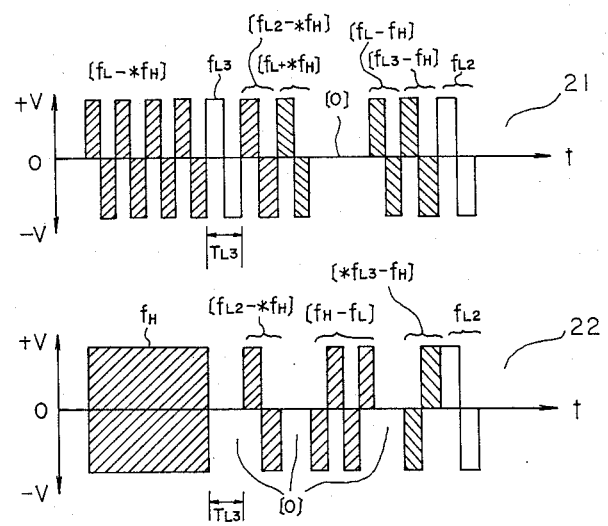

FIG. 3A shows recording signals applied to the signal electrodes 15-18 and FIG. 3B shows a selected signal applied to the common electrode 13. Applied to the common electrode 14 is a signal which is shifted by $T_W/2$ in phase from the signal applied to the common electrode 13. Of the recording signals applied to the signal electrodes 15-18, FIG. 3A shows an on-on recording signal 19 for making both of the paired micro shutters open and an off-off recording signal 20 for rendering both of the paired micro shutters closed. On-off and off-on recording signals are combinations of the first and second halves of the above-mentioned recording signals, similar to waveforms 2 and 3 shown in FIG. 1B. Similarly, as in the case of signal $f_L$, signals $f_{L2}$ and $f_{L3}$ in FIG. 3A represent frequencies lower than crossed frequency, but this embodiment of the present invention uses a signal having a frequency different from that of the signal $f_L$ so as to contain waveforms of integral units within predetermined periods $T_{L1}$ and $T_{L3}$. Therefore, applied to the micro shutters 15a-18a and 15b-18b to which these recording signals 19, 20 and selection signals have been applied are an on-on drive signal 21 and off-off drive signal 22 which are formed by the recording and selection signals, as shown in FIG. 3C. Different from the conventional on-on drive signal 5 and off-off drive signal 8 shown in FIG. 1C, the on-on drive signal 21 contains the low frequency signal $f_{L3}$ for the period $T_{L3}$ of the selected one $T_W/2$, while the off-off drive signal 22 contains a silent signal (0). The on-off drive signal (not shown) contains the low frequency signal $f_{L3}$ for a period $T_{L2}$, while the off-on drive signal contains the period of the silent signal.

The fact that the low frequency signal $f_{L3}$ is inserted like this during the selected period $T_W/2$ for on-drive forces the orientation of liquid crystal molecule toward the electric field more strongly and further enhances on-tendency. As shown by the light transmission characteristics in FIG. 3D, therefore, on-on response characteristics 23 and on-off response characteristic 24 of the micro shutters 15a-18a and 15b-18b enhance the light transmission rate of the shutters for the period $T_{L3}$. More specifically, the light transmission rate which has been reduced to some levels can be restored to their original one by a signal $(f_L + f_H)$ of the on-off drive signal 21 to thereby increase the amount of transmitted light.

Figure 3D:
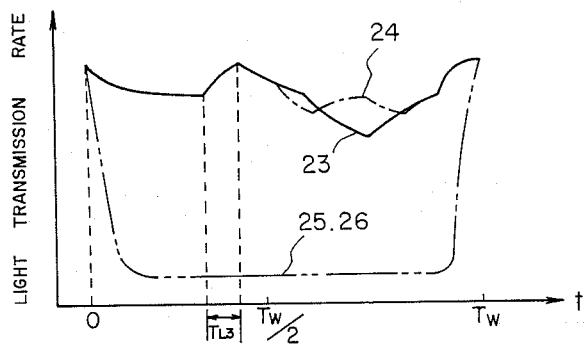

By inserting the silent signal (0) for the selected off-drive period instead of the signal $f_H$, it seems that the dielectric relaxation by which the liquid crystal is shifted to on-operation is reduced to approach natural relaxation, thereby worsening the off-response of the liquid crystal, but any large change is not actually caused, as apparent from off-on and off-off response characteristics 25 and 26 in FIG. 3D, and this insertion of the silent signal (0) serves to give good balance to both of the characteristics 25 and 26.

Figure 4A:
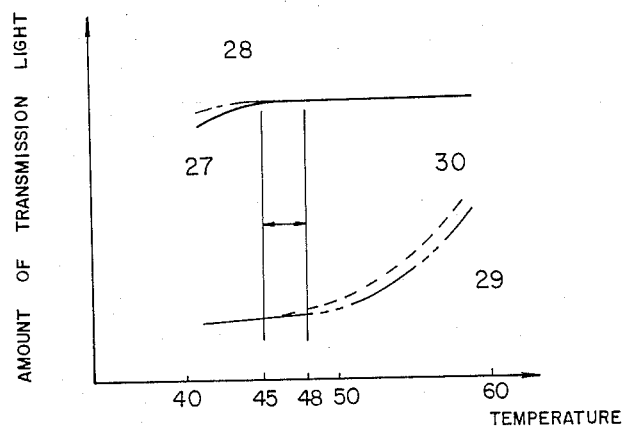
FIGS. 4A and 4B show characteristics of the amount of transmitted light obtained according to the driving method of the prior art and the present invention when the temperature is changed.
Figure 4B:
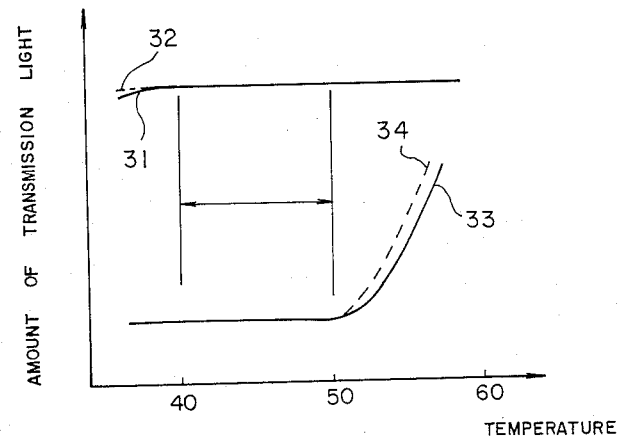

When a waveform into which the low frequency of $f_{L3}$ is inserted for a part $T_{L3}$ of the selected time period $T_W/2$ is used, as described above, a more remarkable on-effect can be attained by the signal $f_{L3}$ in the case of on-drive signal and so-called high frequency hysteresis effect can be prevented by the silent signal (0) in the case of off-drive signal. In the case of the liquid crystal light shutter which repeats its operation, therefore, it can achieve good operation efficiency in its opening and closing operations. Because high frequency components are reduced while low frequency components are increased, the temperature characteristic of the shutter can be improved remarkably and it can perform optimum operation over a wide temperature range. FIGS. 4A and 4B show the results, in which 27 and 31 represent on-on drive characteristics, 28 and 32 on-off drive characteristics, 29 and 33 off-on drive characteristics, and, 30 and 34 off-off drive characteristics. Amounts of light transmitted through the micro shutters by the conventional drive signals (FIG. 4A) are compared with amounts of light transmitted through the microshutters by the drive signals of the present invention (FIG. 4B) in relation to temperatures. As compared with the narrow temperature range of 45°–48° C. shown in FIG. 4A, the optimum temperature range over which the above-described micro shutters can perform their opening and closing operations with good efficiency is wide in the case of the present invention, ranging from 40° C. to 50° C., as shown in FIG. 4B. It should be understood, therefore, from FIG. 4B that the optimum temperature range can be enlarged by the present invention.

A second embodiment of the present invention will be described referring to FIGS. 5A to 5D.

Figure 5D:
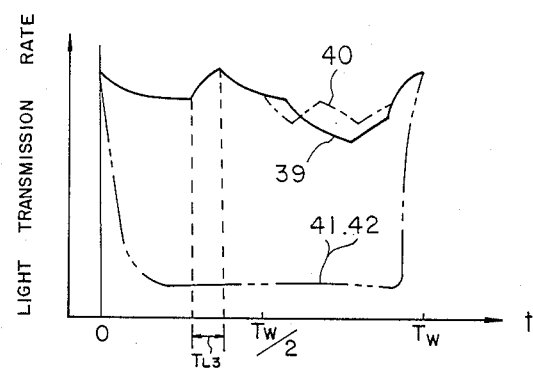
FIGS. 5A through 5C are diagrams showing signals employed by a driving method of another embodiment of the present invention, and FIG. 5D a view showing light transmission characteristics obtained according to the second embodiment driving method of the present invention.
Figure 6A:
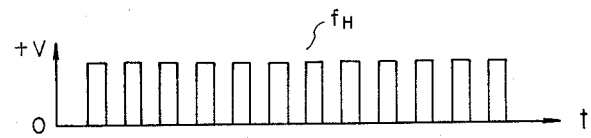
FIGS. 6A through 6C are waveform diagrams intended to explain a signal of $f_{HX}$.
Figure 6B:
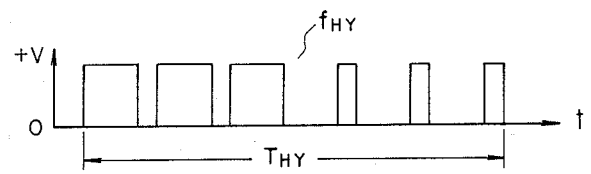
Figure 6C:
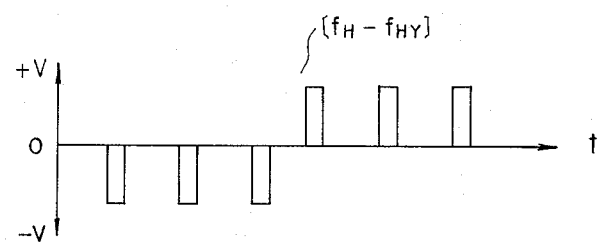

This second embodiment is the same as the first one in that the time period during which the signal $f_{L3}$ is inserted is provided in the selected time period $T_W/2$, but different in that a signal $f_{HY}$ is inserted into the selection signal for a non-selected time period for a time period $T_{HY}$ shown in FIG. 5B. FIG. 6B shows the signal $f_{HY}$ enlarged. The signal $f_H$ of an off-off recording signal 35 shown in FIG. 5A is shown partially enlarged in FIG. 6A. When the signal $f_H$ is combined with the signal $f_{HY}$, it forms the waveform shown in FIG. 6C. more specifically, when the off-off recording signal 35 shown in FIG. 5A and applied to the signal electrodes and a drive signal shown in FIG. 5B and applied to the common electrodes are applied to the micro shutters, they form the waveforms shown in FIG. 5C, and the waveform shown in FIG. 6C is obtained by enlarging a signal ($f_H$- $f_{HY}$) in FIG. 5C. Compared with the conventional signal ($f_L$- $f_H$), the signal ($f_H$- $f_{HY}$) becomes a superposed signal, smaller in duty and accordingly lower in effective value. A signal ($f_L$- $f_{HY}$) of on-on drive signal 37 and off-on drive signal (not shown) which are obtained when the signal $f_L$ of an on-on recording signal 36 shown in FIG. 5A and a selection signal shown in FIG. 5B are applied to the micro shutters is different in phase from the signal ($f_H$- $f_{HY}$) but substantially the same in waveform. Therefore, it can be substantially the same signal as the signal ($f_H$- $f_{HY}$).

When the signal $f_{HY}$ is inserted for the non-selected time period, as described above, it serves to weaken the maintaining of on-operation a little in the case of on-drive but prevents the micro shutters from tending to be open to some extent under a high temperature in the case of off-drive. This fact serves to strengthen the opening operation of micro shutters to some extent for the time period $T_{L3}$, as shown in FIG. 5D A third embodiment of the present invention will be described below.

Figure 7:
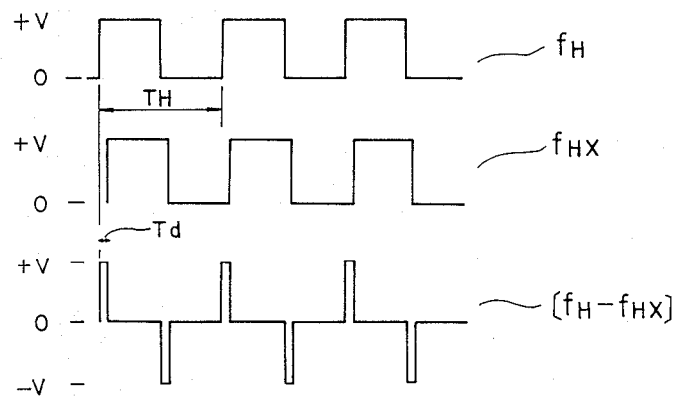
FIG. 7 is a waveform diagram to explain a signal which is employed by the present invention and which is shifted in phase.
Figure 8A:
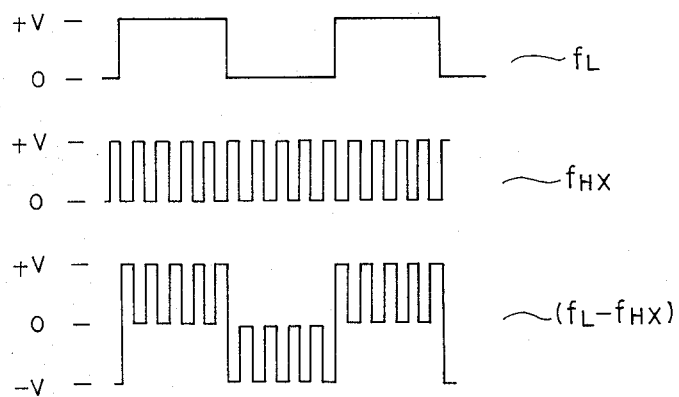
FIGS. 8A and 8B are waveform diagrams for explaining signals which are employed by the present invention and which are shifted in phase.
Figure 8B:
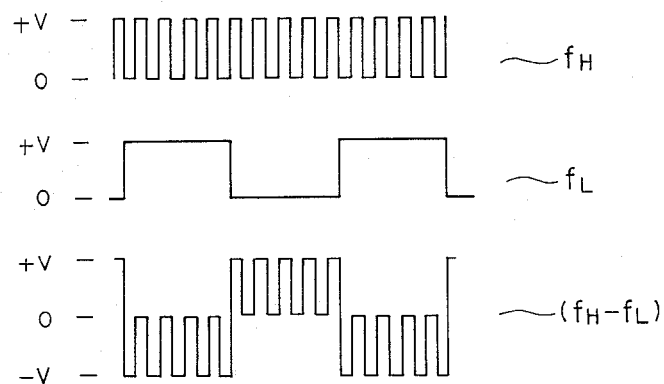

FIG. 7 shows signals $f_H$, $f_{HX}$ which are shifted in phase from the signal $f_H$, and ($f_H$- $f_{HX}$) which are employed by this third embodiment. $T_H$ represents a time period for the signal $f_H$, the signal $f_{HX}$ is delayed by $T_d$ in phase from the signal $f_H$, and the signal ($f_H$- $f_{HX}$) is formed by the signals $f_H$ and $f_{HX}$. When this signal ($f_H$- $f_{HX}$) is applied to the liquid crystal, it shows a closing tendency stronger than when the silent signal is applied but weaker than when the signal $f_H$ or $f_{HX}$ is applied. The closing tendency is determined, depending upon the phase difference $T_d$. FIG. 8A shows a signal ($f_L$- $f_{HX}$) formed by the signals $f_L$ and $f_{HX}$ and FIG. 8B a signal ($f_H$- $f_L$) formed by the signals $f_H$ and $f_L$. It can be understood from FIGS. 8A and 8B that both of the signals are substantially the same in waveform and achieve the sam effect in driving the liquid crystal light shutter.

Figure 1A:
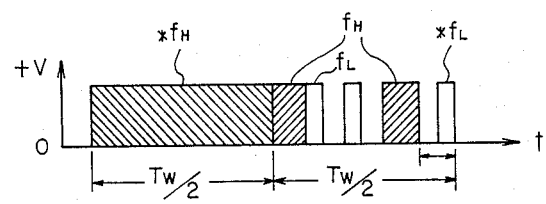
FIGS. 1A through 1C are waveform diagrams showing signals employed by the conventional driving method, and FIG. 1D a view showing light transmission characteristics obtained according to the conventional driving method.
Figure 1B:
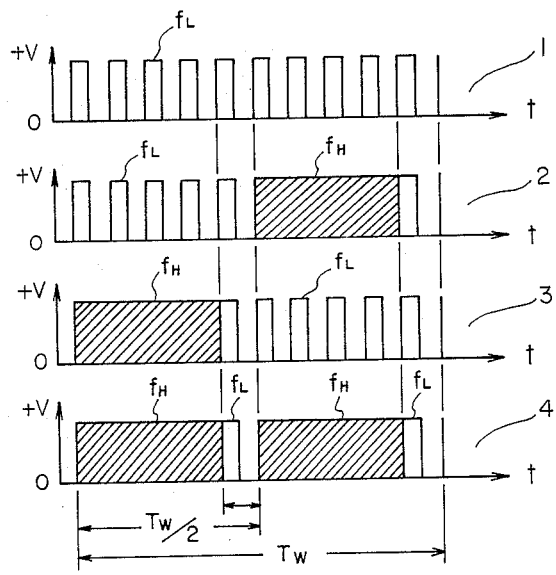
Figure 9:
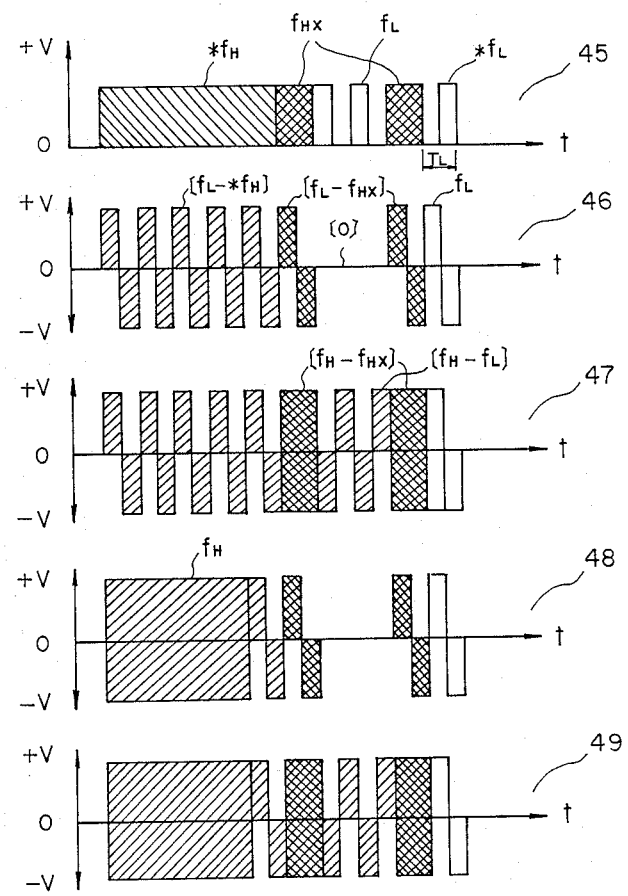
FIG. 9A is a waveform diagram for explaining a driving method of the present invention and FIG. 9B is a view showing light transmission characteristics obtained according to the driving method of the present invention.
Figure 9:
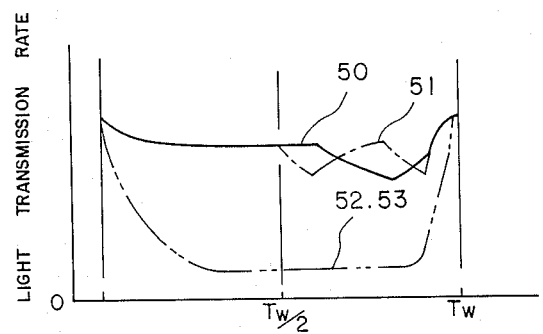

The third embodiment is intended to apply to the liquid crystal light shutter a drive signal in which the signal $f_{HX}$ shifted by $T_d$ in phase from the signal $f_H$ or a drive signal containing the signal $f_{HX}$ is mixed for the non-selected time period shown in FIG. 1B. FIG. 9A shows this pattern signal.

In FIG. 9A, a selected signal 45 is applied to the common electrode 13, and deive signals 46–49 which drive the liquid crystal light shutter can be obtained by selecting one of the pattern signals 1–4 shown in FIG. 1B and applying it to the signal electrodes 15–18. Light transmission characteristics shown in FIG. 9B can be obtained by applying these drive signals 46–49 to the liquid crystal light shutter. Light transmission characteristics 50, 51, 52 and 53 are those of the micro shutter 15a, for example, obtained when the liquid crystal light shutter is driven by the superposed signals 46, 47, 48 and 49. More specifically, the light transmission characteristic 50 is obtained when both of the micro shutters 15a and 15b, for example, are opened, the light transmission characteristic 51 when the micro shutter 15a is opened while the micro shutter 15b is closed, the light transmission characteristic 52 when the micro shutter 15a is closed while the micro shutter 15b is opened, and the light transmission characteristic 53 when both of the micro shutters 15a and 15b are closed. When the light transmission characteristics shown in FIG. 9B are compared with those shown in FIG. 1D, the light transmission characteristics 50 and 51 are substantially the same as the light transmission characteristics 9 and 10, but the light transmission characteristics 52 and 53 are different from the light transmission characteristics 11 and 12. As apparent from the above, the light transmission characteristics 52 and 53 which are obtained by the third embodiment, using the pattern signal 45, show that the off-time period is longer for the non-selected time period $T_W/2$ - $T_W$ to reliably bring the liquid crystal light shutter into an off-state.

Figure 1C:
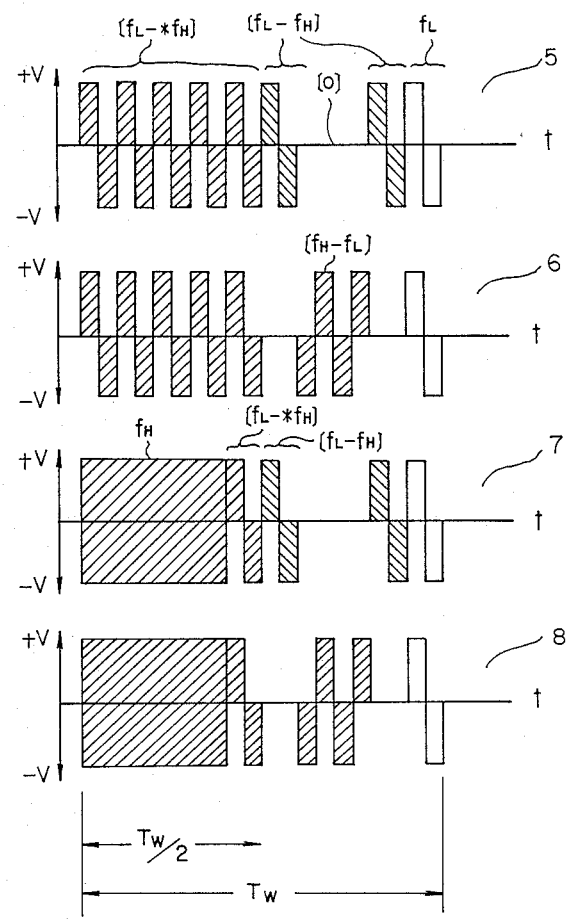
Figure 1D:
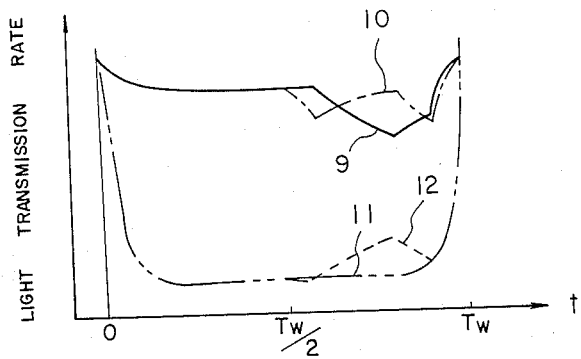
Figure 10:
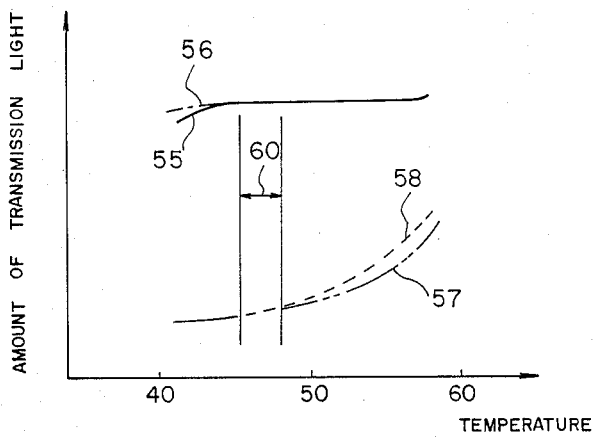
FIGS. 10A and 10B show characteristics of the amount of transmitted light.
Figure 10:
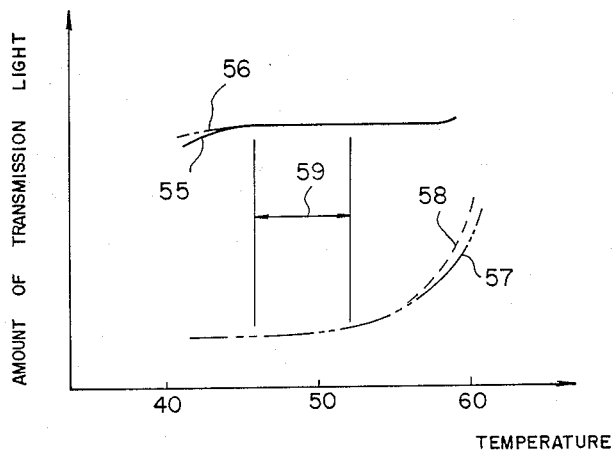

FIG. 10A shows the relationship between the amount of transmitted light and operation temperature of the microshutters, obtained when the conventional pattern signals shown in FIG. 1C are applied to them, and FIG. 10B the relationship between the amount of transmitted light and operation temperature obtained when the pattern signals of the present invention are applied to them. A numeral 55 represents the amount of transmitted light obtained when both of the microshutters 15a and 15b, for example, are opened; 56, those obtained when the micro shutter 15a is opened while the microshutters 15b closed; 57, those obtained when the micro shutter 15a is closed while the micro shutter 15b opened; and 58, those obtained when both of the microshutters 15a and 15b are closed. As apparent from FIGS. 10A and 10B, the amounts of transmitted light 55 and 56 have little difference between them, but the optimum temperature range over which the amounts of transmitted light 57 and 58 have no difference between them in FIG. 10B is wider when compared with the conventional one shown in FIG. 10A. The optimum temperature range 59 of the present invention is about 6 degrees, two times wider on the side of high temperature, when compared with the conventional optimum temperature range 60 which is 3 degrees.

According to the above-described third embodiment, the difference between influences of time division drive effected can be absorbed to balance light response and improve the state of the liquid crystal light shutter for the non-selected time period, by combining positions and time periods of signals $f_{HX}$ and $f_L$ of the drive signal 46 shown in FIG. 9A for the non-selected time period. Further, when it is assumed that the period for the signals $f_H$ and $f_{HX}$ is represented by $T_H$ in the case where the signal ($f_L$-$f_H$) or ($f_L$-$f_{HX}$) is continuous, balance at the time of high temperature can be compensated by inserting the signal ($f_H$-$f_{HX}$), which has an effective value of $\sqrt{2T_d/T_H}$, before and after it, thereby enabling the drive temperature range of the liquid crystal light shutter to be widened. This means that the control circuit necessary to produce the voltage value of the pattern signal ca be simplified because it is not necessary to produce various and multiple voltage values of the pattern signal as in the conventional case.

A case where a waveform which is obtained by transforming the selected signal 45 used by the third embodiment and shown in FIG. 9A is applied to the common electrodes 13 and 14 will be described referring to FIGS. 11 through 14.

Figure 11:
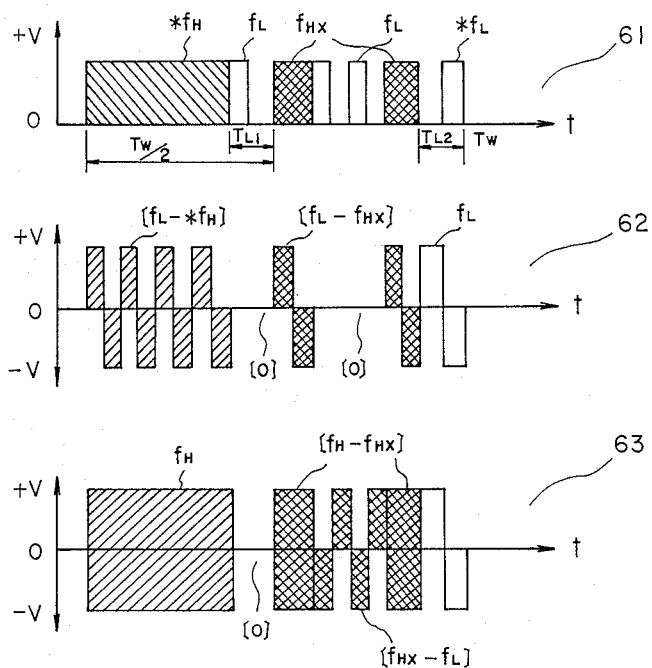
FIG. 11 is a waveform diagram for expaining a driving method of a further embodiment of the present invention.

FIG. 11 is also intended to explain the present invention, using 2-time division drive, wherein a selected signal 61, in which the signal $f_L$ is inserted for a last time period $T_{L1}$ in the first half $T_W/2$ of one writing time period $T_W$ is employed. Four drive signals are formed in this case too, and their combination for the non-selected time period is represented by second halves of drive signals 62 and 63. Even when the characteristic of the liquid crystal light shutter changes depending upon the liquid crystal used, this change can be met by applying the drive signals 62 and 63 to the liquid crystal light shutter. The optimum temperature range 59 can be kept wide by changing the time of the time period $T_{L1}$ or the frequency of the signal $f_L$, for example.

Figure 12:
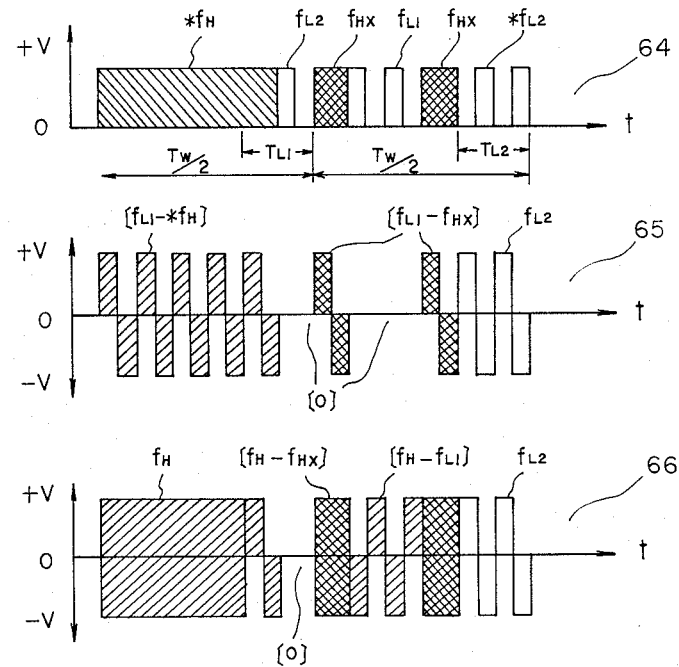
FIGS. 12 through 14 are waveform diagrams for explaining a driving method of a still further embodiment of the present invention.

FIG. 12 shows a selected signal 64 in which signals $f_{L2}$ and *$f_{L2}$ which is shifted by 180° in phase from the signal $f_{L2}$ are inserted for last time periods $T_{L1}$ and $T_{L2}$ in the first and second halves $T_W/2$ of one writing time period $T_W$. The signals which are applied to the signal electrodes are similar to those shown in FIG. 1B but the signal $f_L$ of FIG. 1B is replaced by $f_{L1}$ and $f_{L2}$. Four drive signals are also formed in this case and their combination for the non-selected time period is represented by the halves of drive signals 65 and 66 and can be used as a signal to guarantee the optimum temperature range 59 even when the combination of recording elements and the like are changed. The signals $f_{L1}$ and $f_{L2}$ have frequencies contained in one writing time period $T_W$ in this case and any signal having a frequency lower than the frequency $f_C$ can be employed. This embodiment uses a frequency which has integral units of waveforms contained in one writing time period.

Figure 13:
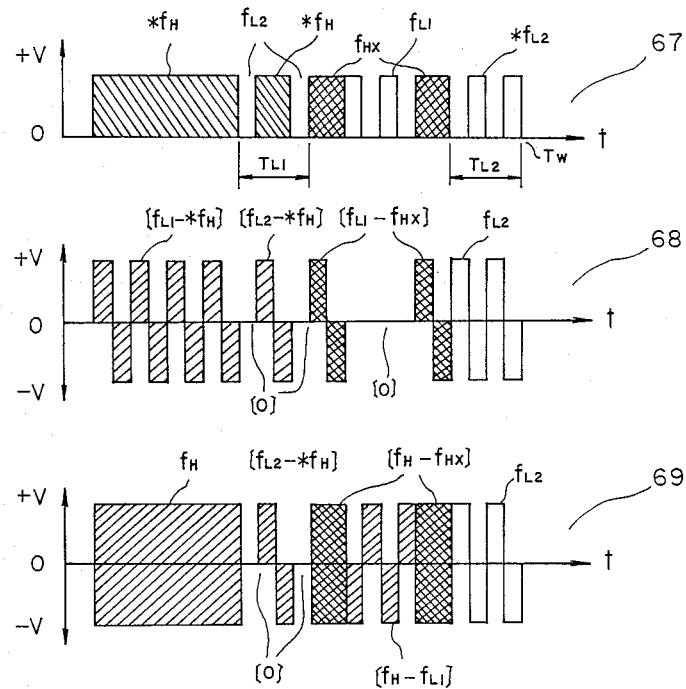

FIG. 13 shows a selected signal 67 in which the signal $f_{L2}$ for the time period $T_{L1}$ is replaced by a combination signal of signals $f_{L2}$ and *$f_H$. Similar to the case shown in FIG. 12, the drive signal for the non-selected time period according to 2-time division drive is represented by second halves of signals 68 and 69 and can be used as a signal to guarantee the optimum temperature range 59 for the liquid crystal light shutter.

Figure 14:
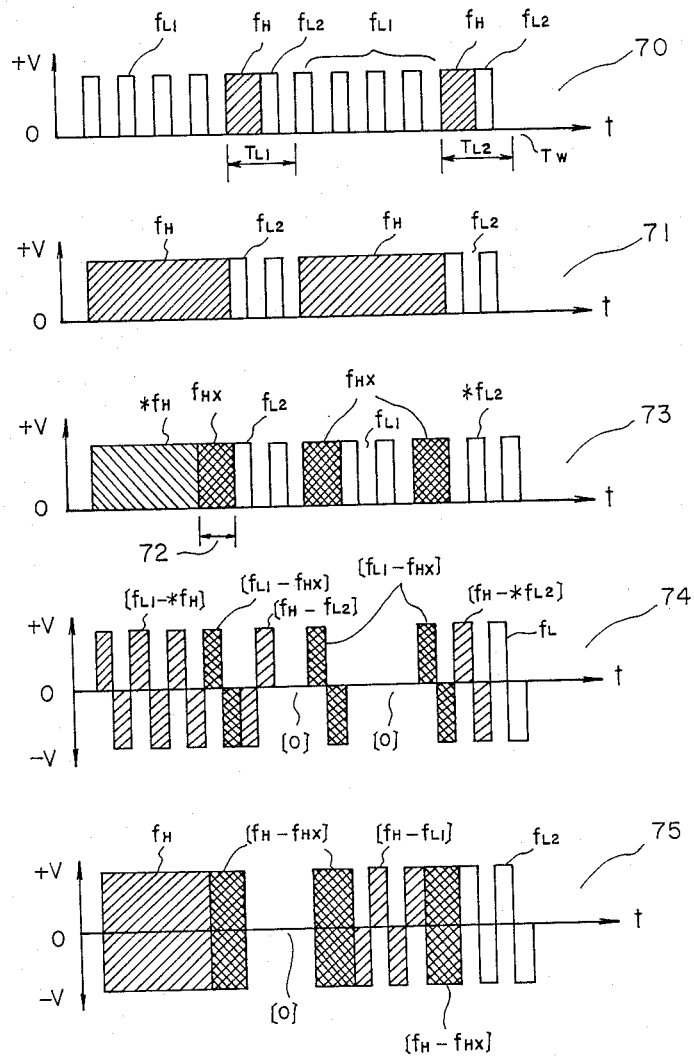

FIG. 14 shows recording signal 70 of those applied to the signal electrodes and in which the signal $f_H$ is inserted for first halves of time periods $T_{L1}$ and $T_{L2}$ intended to set the liquid crystal light shutter open; and a recording signal 71 of those applied to the signal electrodes and in which the signal $f_L$ is duplicately inserted for the first halves of time periods $T_{L1}$ and $T_{L2}$ intended to set the liquid crystal light shutter closed. Superposed signals 74 and 75 are formed by a selected signal 73 in which the signal $f_{HX}$ is used for part of the selected time period, and they are applied, as liquid crystal light shutter driving signals, to the common electrodes. The optimum temperature range 59 for liquid crystal light shutters can also be made wide in this case, similarly to those cases of drive signals 62, 63, 65, 66, 68 and 69 shown in FIGS. 11 through 13.

According to the above-described embodiment, the difference between time periods during which the micro shutters 15a–18a and 15b–18b are held open or closed and which is caused by the difference between drive waveforms for the non-selected time period can be made small regardless of signals applied to the micro shutters 15a–18a and 15b–18b. In addition, the optimum temperature range 59 for the liquid crystal light shutters can be widened and kept a it is even when combination of recording elements and the like are changed.

According to the present invention as described above, there can be provided, a time division drive device for a liquid crystal light shutter whereby the liquid crystal light shutter can be operated over a wide temperature range with excellent performance and contrast when the signal $f_{L3}$ is added to the time period $T_{L3}$ of the selected time period,while a selection signal including the signal $f_{HY}$ or $f_{HX}$ is added to the non-selected time period to most suitably meet the dielectric and temperature characteristics of a liquid crystal.

As described above, the temperature range most suitable for driving the liquid crystal light shutters can be widened by driving the liquid crystal light shutters with the signal $f_{HY}$ or $f_{HX}$ which is different in phase from the signal $f_{HY}$. It is not necessary in the present invention that the signal has multiple values to meet the temperature change of the liqui crystal light shutter. Further, the contrast of the liquid crystal light shutter open and closed can be enhanced by containing the signal $f_{L3}$ in the selected time period, thereby producing an excellent contrast of images recorded through the liquid crystal light shutter. Furthermore, since the operation temperature range is made wide, liquid crystal material and the like can be changed more freely.

What is claimed is:

1. A method of driving a liquid crystal shutter including n common elongated electrodes, a plurality of signal electrodes transverse to and overlying said common electrodes but spaced therefrom, and microshutters formed at overlying positions of said common and signal electrodes by sealing a liquid crystal material in the space between overlying electrodes, said material exhibiting dielectric anisotropy that disappears upon application of an electric field having a specified frequency, said method comprising the steps of:

(a) applying to said common electrodes, a selected signal having higher and lower frequencies than said specified frequency during an interval of time Tw which defines a write period, and which is divided into n time intervals, the phase of the selected interval in a succeeding subinterval Tw/n being shifted from the phase of the selected signal in the preceding subinterval Tw/n;

(b) applying to said signal electrodes, a recording signal having the same amplitude as that of said selected signal, and having higher and lower frequencies than said specified frequency or having a lower frequency than said specified frequency during said time Tw, each subinterval Tw/n divided into first, second and third successive portions;

(c) the application of said selected signal to said common electrodes and the application of said recording signal to said signal electrodes producing a resultant drive signal on each microshutter;

(d) said selected and recording signals being such that, during a selected subinterval, the resultant drive signal has either:

(1) frequencies higher and lower than said specified frequency during the first portion of the selected subinterval; a frequency lower than said specified frequency during the second portion of the selected subinterval; and frequencies higher and lower than said specified frequency during the third portion of the selected subinterval; or (2) a frequency higher than said specified frequency during the first part of the selected subinterval; a zero frequency during the second portion of the selected subinterval; and frequencies higher and lower than said specified frequency during the third portion of the selected subinterval, whereby the microshutters are opened or closed during the selected subinterval;

(e) said selected and recording signals being such that during a non-selected subinterval, the resultant drive signal has: a frequency lower than said specified frequency during the third portion of the non-selected subinterval; frequencies higher and lower than said said specified frequency and a zero frequency during the first and second portions of the non-selected subinterval, whereby the microshutters are established as being opened or closed during a selected interval and maintained in their above state during a non-selected interval.

2. A method of driving a liquid crystal shutter according to claim 1 wherein the recording signal is constructed taking said subinterval Tw/n as one unit consists of a lower frequency waveform having a prescribed phase and a frequency lower than said specified frequency or of a combined waveform yielded by combining a high frequency waveform that has a prescribed phase and a frequency higher than said specified frequency, a low frequency waveform that has a phase opposite to said prescribed phase low frequency waveform, and a low frequency waveform that has the same phase as said prescribed phase low frequency waveform in this order, wherein said selected signal in said first period of said selected subinterval is a high frequency waveform having the opposite phase to said prescribed phase high frequency waveform, wherein said selected signal in said second period is a low frequency waveform having phase opposite to said prescribed phase low frequency waveform, wherein said selection signal in said third period is a high frequency waveform having a phase opposite to said prescribed phase high frequency waveform, and wherein said selected signal in said non-selected subinterval is composed of a low frequency waveform having the opposite phase to said prescribed phase low frequency waveform supplied in the last period of said non-selected subinterval, a high frequency waveform having the same phase as said prescribed phase high frequency waveform, and a low frequency waveform having the same phase as said prescribed phase low frequency waveform.

3. A method of driving a liquid crystal shutter according to claim 1 wherein n=2.

4. A method of driving a liquid crystal shutter according to claim 2 wherein n=2.

5. A method of driving a liquid crystal shutter having n common electrodes, a plurality of signal electrodes transverse to and overlying said common electrode but spaced therefrom, and microshutters formed at overlying positions of said common signal electrodes by sealing a liquid crystal material in the space between overlying electrodes, said material exhibiting dielectric anisotropy that disappears upon application of an electric field having a specified frequency, said method comprising the steps of:

(a) supplying to said signal electrodes, a recording signal that consists of a low frequency waveform having a prescribed phase and a frequency lower than said specified frequency or of a combined waveform yielded by combining a high frequency waveform having a prescribed phase and a frequency higher than said specified frequency, and a low frequency waveform having the same phase as said prescribed phase low frequency waveform during a subinterval which divides the writing interval Tw into n subintervals; and (b) applying to said common electrode, a selected signal composed of a signal of a high frequency waveform having a phase opposite to said prescribed phase high frequency waveform, a signal of a high frequency waveform slightly different in its phase from said prescribed phase high frequency waveform, a signal of a low frequency waveform having the same phase as said prescribed phase low frequency waveform, a signal of a low frequency waveform having the opposite phase to said prescribed phase low frequency waveform, said selected signal further having the same amplitude as that of said recording signal, and the phase of the selected signal in a succeeding subinterval Tw/n being shifted from the phase of the selected signal in the preceding subinterval Tw/n;

(c) the application of said selected signal to said common electrodes and the application of said recording signal to said signal electrodes producing a resultant drive signal on each microshutter;

(d) said selected and recording signals being such that the resultant drive signal has either:

(1) a waveform having a higher frequency than said specified frequency during a first portion of the selected subinterval; a waveform having a lower frequency than the said specified frequency during the last portion of the non-selected subinterval; a waveform composed of a superposed waveform of said prescribed phase high frequency waveform and a high frequency waveform having a phase slightly different from said prescribed phase high frequency waveform, and a superposed waveform of frequencies higher and lower than said specified frequency in a writing interval other than said first portion and said last portion;

(2) a waveform having a frequency higher than said specified frequency during the first portion of the selected subinterval; a waveform having a frequency lower than said specified frequency during the last portion of a non-selected subinterval; a waveform composed of a superposed waveform of frequencies higher and lower than said specified frequency, and a waveform having a zero frequency and a writing interval other than said first portion and said last portion; or (3) a superposed waveform of frequencies higher and lower than said specified frequency during the first portion of the selected subintervals; a waveform having a frequency lower than said specified frequency during the last portion of the non-selected subinterval; a waveform composed of a superposed waveform of said prescribed phase high frequency and a high frequency having a phase slightly different from said prescribed phase high frequency waveform and a superposed waveform of frequencies higher and lower than said specified frequency in a writing interval other than said first interval and said last portion; or (4) a superposed waveform of frequencies higher and lower than said specified frequency during the first portion of the selected subinterval; a waveform having a frequency lower than said specified frequency during the last portion of the non-selected subinterval; a wave composed of a superposed waveform of frequencies higher and lower than said specified frequency and a waveform having a zero frequency and a writing interval other than said portion and said last portion.

6. A method of driving a liquid crystal shutter according to claim 5 $n=2$.

* * * * *

UNITED STATES PATENT AND TRADEMARK OFFICE
CERTIFICATE OF CORRECTION

PATENT NO. : 4755812                                              Page 1 of 3

DATED      : 07/05/88

INVENTOR(S) : Morio OHTA et al.

It is certified that error appears in the above-identified patent and that said Letters Patent is hereby corrected as shown below:

Title page: line 5 of the Abstract, change "microshutters" to ---micro shutters---.

line 9 of the Abstract, change "grater" to ---greater---.

line 12 of the Abstract, change "microshutters" to ---micro shutters---.

lines 19 & 23 of the Abstract, change "microshutters" to ---micro shutters---.

line 24 of the Abstract, delete "-" at the end of line 28.

At column 1, line 25, insert ---.--- after "(fc)" and before "In".

At column 2, line 2, change "have" to ---has---.

At column 2, line 16, change "pattern" to ---recording---.

At column 2, line 35, change "are" to ---is---.

At column 3, line 36, insert ---waveform--- after "are" and before "diagrams".

At column 5, line 22, delete "." after "C" and before "shown".

At column 5, line 28, delete periods after first "C" and before "to" and after second "C" and before comma.

At column 5, line 43, change "more" to ---More---.

At column 6, line 18, change "sam" to ---same---.

At column 6, line 27, change "deive" to ---drive---.

UNITED STATES PATENT AND TRADEMARK OFFICE
CERTIFICATE OF CORRECTION

PATENT NO. : 4755812

DATED : 07/05/88

INVENTOR(S) : Morio OHTA et al.

It is certified that error appears in the above-identified patent and that said Letters Patent is hereby corrected as shown below:

At column 6, line 62, change "trans mitted" to ---transmitted---.

At column 6, line 66, change "microshutters" to ---micro shutters---.

At column 6, line 68, delete "-" after "micro".

At column 7, line 3, delete "-" after "micro".

At column 8, line 14, delete "a" after "and".

At column 8, line 19, delete "a" after "by" and before "selected".

At column 8, line 35, change "a" to ---as---.

At column 8, line 53, change "liqui" to ---liquid---.

At column 8, line 65, change "microshutters" to ---micro shutters---.

At column 9, line 22, change microshutters" to ---micro shutter---.

At column 9, line 39, change "microshutters" to ---micro shutters---.

At column 9, line 46, delete "said" (2nd occurrence).

At column 9, lines 48-49, change "microshutters" to ---micro shutters---.

At column 10, line 21, change "microshutters" to ---micro shutters---.

UNITED STATES PATENT AND TRADEMARK OFFICE
CERTIFICATE OF CORRECTION

PATENT NO. : 4755812
DATED : 07/05/88
INVENTOR(S) : Morio OHTA et al

It is certified that error appears in the above-identified patent and that said Letters Patent is hereby corrected as shown below:

At column 10, line 58, change "microshutters" to ---micro shutters---.

Signed and Sealed this

Twenty-sixth Day of December, 1989

Attest:

JEFFREY M. SAMUELS

Attesting Officer     Acting Commissioner of Patents and Trademarks